United States Patent

Kreling et al.

[11] 3,952,786
[45] Apr. 27, 1976

[54] UNITARY WHEEL AND TIRE ASSEMBLY

[75] Inventors: William F. Kreling, St. Louis, Mo.;
Vernon W. Sappington, Granite City, Ill.

[73] Assignee: Plasco, Inc., St. Louis, Mo.

[22] Filed: July 1, 1974

[21] Appl. No.: 484,615

[52] U.S. Cl. .............................. 152/323; 152/310; 301/63 PW
[51] Int. Cl.² ...................... B60C 7/00; B60B 5/02
[58] Field of Search.... 152/179, 180, 190, 310–312, 152/323, 379; 301/63 PW

[56] References Cited
UNITED STATES PATENTS

| | | | |
|---|---|---|---|
| 3,387,894 | 6/1968 | Louik | 301/63 PW |
| 3,452,798 | 7/1969 | Ravreby | 301/63 PW |
| 3,666,322 | 5/1972 | Pickron | 301/63 PW |

*Primary Examiner*—Drayton E. Hoffman
*Attorney, Agent, or Firm*—Ralph W. Kalish

[57] ABSTRACT

A unitary wheel and tire assembly comprising an injection-molded, thermoplastic wheel and a tire which is injection-molded on the wheel. The tire is of elastic material, such as synthetic or natural rubber, and having irregular inner surface portions complementary to the irregularity in the confronting surface portions of the wheel to bring about a reliable mechanical interfit.

3 Claims, 3 Drawing Figures

UNITARY WHEEL AND TIRE ASSEMBLY

BACKGROUND AND SUMMARY OF THE INVENTION

This invention relates in general to vehicular wheels and, more particularly, to a unitary wheel and tire assembly.

Heretofore in the toy field it has been the practice of molding a wheel entirely of rubber, or of molding a relatively non-elastic tire to a wheel. Such assemblies have admittedly been useful only for toys and miniature models so that limited wear and scarcely minimum stresses have been encountered.

With wheels of larger character for practical usage, such as with industrial carts of all type, as well as with vehicle frames adapted to support substantial weight, there have only been utilized independently formed tires mountable upon the wheel by various conventional well known mechanical expedients. Understandably, wheels and tire assemblies of the last mentioned character have been relatively costly, both in production, as well as in use.

Therefore, it is an object of the present invention to provide a unitary wheel and tire assembly comprising a wheel molded of thermoplastic resin and having a resilient, wear-resistant tire molded directed thereupon, which assembly is capable of versatile practical usage, such as, for example, with industrial carts of all types, small tractors, lawn mowers, etc., and thus being of diameters considerably greater than wheels used on toys and miniature models.

It is another object of the present invention to provide an assembly of the character stated which comprehends a wheel having an irregular exterior surface for effecting an intimate, tenacious, mechanical bond with confronting internal surface portions of the tire.

It is a further object of the present invention to provide a unitary wheel and tire assembly wherein the tire possesses markedly elastic characteristics, having a high coefficient of friction and thereby conducing to excellent traction.

It is a still further object of the present invention to provide a unitary wheel and tire assembly wherein the wheel may be foam-molded for enhancing the strength thereof, as well as bringing about substantial economies in the cost of production.

It is another object of the present invention to provide a unitary wheel and tire assembly which, as stated, is adapted for wide application; which is reliable and durable in usage, being resistant to accidental parting of the tire under stress-producing conditions, including developed radially applied forces; and which by its simplicity, is amenable to low cost, high volume manufacture.

It is a still further object of the present invention to provide a method for producing a unitary wheel and tire assembly which may be most economically accomplished by currently available equipment.

DESCRIPTION OF THE PREFERRED EMBODIMENT

Figure 1:
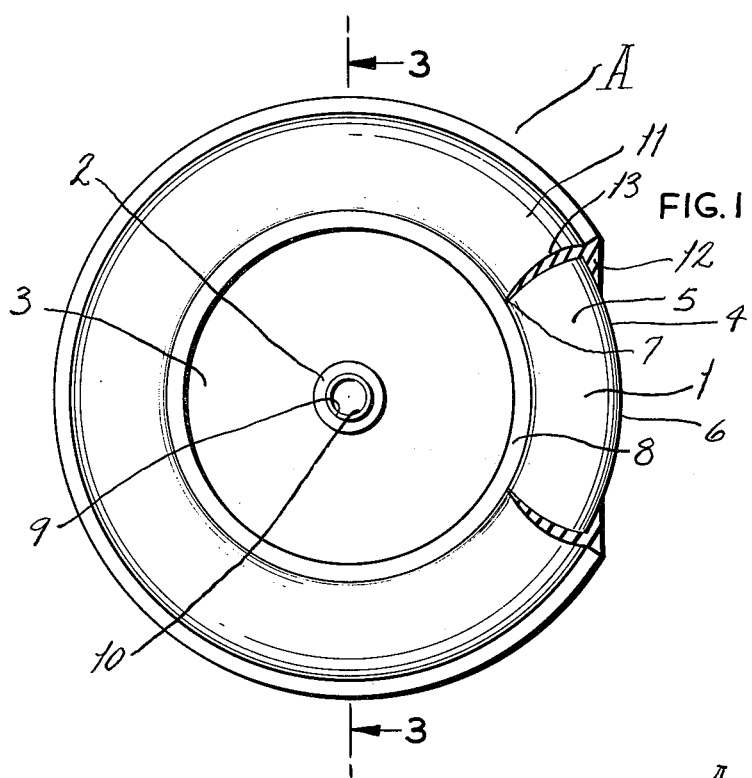
FIG. 1 is a side elevational view of a unitary wheel and tire assembly constructed in accordance with and embodying the present invention, showing a portion of the tire cut away.
Figure 3:
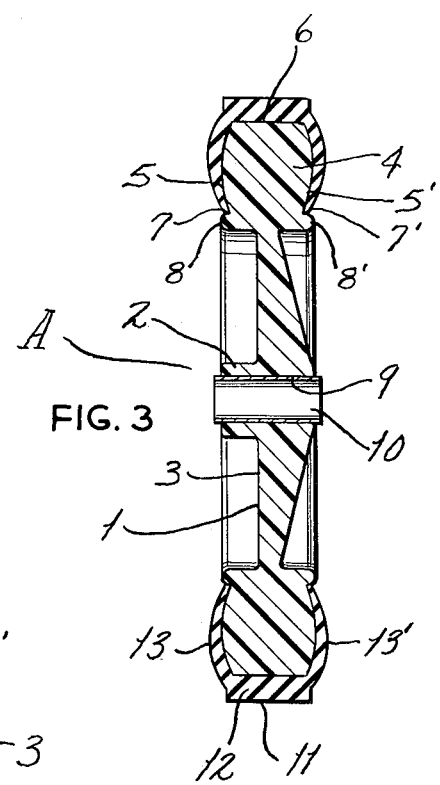
FIG. 3 is a vertical transverse sectional view taken on the line 3—3 of FIG. 1.
Figure 2:
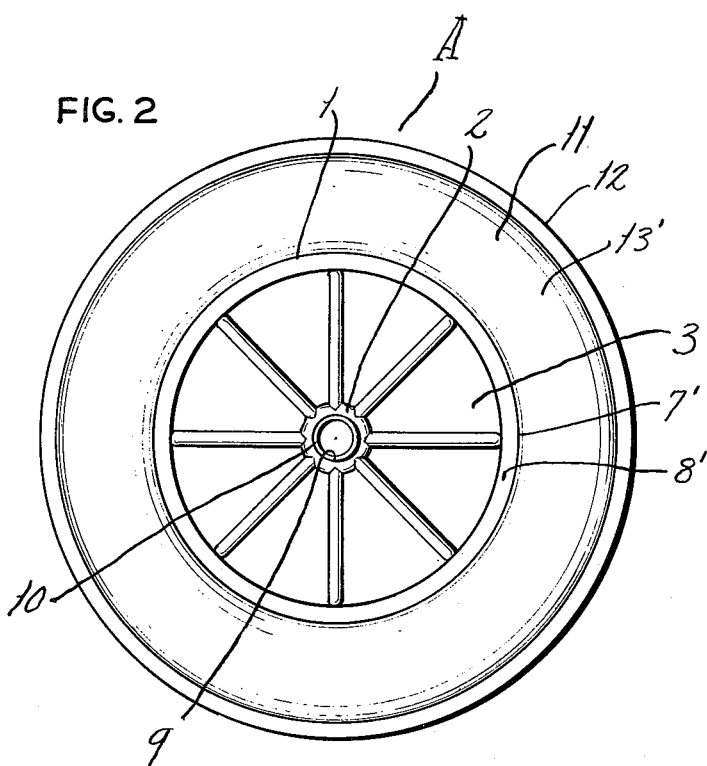
FIG. 2 is a side elevational view of the wheel and tire assembly taken from the opposite side as that shown in FIG. 1.

Referring now by reference numerals to the drawings which illustrate the preferred embodiment of the present invention, A designates a unitary wheel and tire assembly comprising a wheel 1 molded of a suitable thermoplastic resin, such as, polystyrene, polyethylene, polyphylene oxide, and polycarbonate, to which is preferably added a conventional blowing agent, such as, CELOGEN= for expanding or foaming of the resin. The incorporation of a blowing agent is preferred as such is conducive to strengthening of the wheel while promoting reduction of cost in manufacture.

=CELOGEN is a trademark of U.S. Rubber Corporation for para, para'-oxybis (benzenesulfonyl-hydrazide)

The exterior surface portion of wheel 1 is irregular, uneven, or rough, which characteristic is achieved through foaming of the resin, as well as by reason of the surface configuration of the mold utilized.

Wheel 1, being formed integrally by injection molding, includes a hub 2, a central, spoke simulative section 3, a web 4, which latter includes slightly convex or outwardly arcuated side wall portions 5,5', and a peripheral circumferential surface or rim edge 6, which latter is substantially flat in cross-section. The radially inward ends of side wall portions 5,5' terminate at annular shoulders 7,7', respectively, formed on beads 8,8' between said web 4 and central section 3. Hub 2 is provided with an opening 9 for receiving a metal insert or bearing 10 for journaling of an axle (not shown) therein.

Molded upon web 4 of wheel 1 is a tire 11 of natural or synthetic rubber, having a solid tread 12 disposed upon wheel edge 6 and with there being annular lateral portions 13,13' which coveringly embrace side wheel portions 5,5' of wheel web 4 in conformity to the curvature thereof, and with their inner edges abutting against the face of shoulders 7,7', respectively.

Tire 11 is thus snugly fitted in a complementary manner upon wheel web 4 and is tightly wedded thereto by reason of the unevenness of the contacting surfaces of said web 4 which causes the development of reverse irregularities in the confronting tire face portions to promote a reliable, tenacious bond; there being thus a mechanical interfit. The contacting face portions of tire 11 will accommodate to the surface roughness of wheel web 4 as the latter constitutes a portion of the mold for forming tire 11. Additionally, there is the expected shrinkage of the elastic or rubber material upon cooling so that the grip of tire 11 upon wheel 1 is further markedly increased. Accordingly, the entire surface of wheel web 4 is covered by tire 11, that is, throughout side portions 5, 5' and rim edge 6, thereby conducing to a relatively enlarged interface. For apparent wear purposes, tire tread 12 is of greater thickness than annular lateral portions 13,13', as the latter function for wheel gripping, as opposed to support surface contact.

Tire 11 is applied directly upon wheel 1 by injection-molding and such application constitutes the second step in a fundamentally two-stage molding process. The blowing agent-supplied thermoplastic resin is charged to an injection mold for forming wheel 1 in accordance with well known techniques. Thereupon, the molded wheel 1 is placed in a second mold and the natural or synthetic rubber to constitute tire 11 is charged to said such second injection mold and thereupon tire 11 is formed. It will be seen that wheel 1 in such second mold constitutes an integral part thereof. There need be no appreciable delay between the two molding steps so that the production may be effected in a rapid, high volume manner.

Tire 11 as so integrated upon wheel 1 is resistant to withdrawing forces. In actual practice, a wheel having a 8 inch diameter, and with a tire having a tread of ¼ inch, effectively resists a 400 pound radially applied withdrawing force upon such tire. Thus, the union between tire 11 and wheel 1 is strong enough to resist the various forces and stresses encountered throughout the vicissitudes of intended usage.

Wheels produced in accordance with the present invention have wide application in industry, being especially suitable for two-, three-, and four-wheel carts of all types and varieties, as well as for lawn mowers, small tractors, and like horiticultural instrumentalities, and, in addition, are suitable for rendering various articles mobile, such as work benches, tool cabinets, etc.

Wheel and tire assemblies of the present invention are especially suitable for wheels having a diameter within the range of 5 to 15 inches and which range has to the present time been accommodated either by pneumatic tires or by hard, non-elastic tires separately formed from the wheel and engaged thereon through various well known expedients.

The tread 12 of tire 11 may have a thickness varying from ¼ inch to ¾ inch; for example only, an 8 inch tire-equipped wheel having a ¼ inch tread has proved to be an extremely popular efficient size. Thus, the present invention is not intended for toy or miniature model usage, but for a considerable range of wheel purposes which to the present time have only been accommodated by pneumatic tires.

Having described our invention, what we claim and desire to obtain by Letters Patent is:

1. A wheel structure comprising a wheel portion and a tire portion, said wheel and tire portions being unitary and inseparable without wheel structure destruction, said wheel portion having a hub section, a web section disposed radially outwardly of said hub section, said web section having side walls and a cylindrical end wall, means connecting said hub section and said web section, said tire portion having a first surface of substantially corresponding extent as said wheel portion cylindrical surface and lateral components having inner surfaces of substantially coincident extent as said wheel web section side walls, said tire first surface and said lateral component inner surfaces being secured substantially throughout the entirety of their said surfaces with the cylindrical surface and side wall surfaces respectively of said wheel section whereby the same are intimately united throughout substantially the entirety of the respective interfaces, the material of construction of said wheel section and tire section being mutually adhesively compatible without the intervention of glutinous substances.

2. A wheel structure as defined in claim 1 and further characterized by said wheel portion cylindrical surface and side walls having random surface irregularities throughout substantially the entirety of their extent and said tire portion in its first surface and said lateral component inner surfaces having complementary irregularities throughout substantially the entirety of their respective extent whereby the area of union at the respective interfaces is enhanced.

3. A wheel structure as defined in claim 1 and further characterized by said wheel portion being constructed of thermoplastic material and said tire portion being constructed of resilient elastic material.

* * * * *